(12) United States Patent
Gillam

(10) Patent No.: US 6,626,960 B1
(45) Date of Patent: Sep. 30, 2003

(54) METHOD, SYSTEM, AND PROGRAM FOR GENERATING A TABLE TO DETERMINE BOUNDARIES BETWEEN CHARACTERS

(75) Inventor: Richard Theodore Gillam, San Jose, CA (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 09/388,330

(22) Filed: Sep. 1, 1999

(51) Int. Cl.⁷ .................................................. G06F 17/00
(52) U.S. Cl. ........................ 715/531; 715/521; 382/229; 704/9; 704/10
(58) Field of Search ................................. 707/521, 530, 707/531, 532; 382/229, 230, 231; 704/8, 9, 10

(56) References Cited

U.S. PATENT DOCUMENTS

| | | | |
|---|---|---|---|
| 4,777,617 A | * 10/1988 | Frisch et al. | .................. 704/8 |
| 4,873,634 A | * 10/1989 | Frisch et al. | ................ 707/533 |
| 4,887,212 A | 12/1989 | Zamora et al. | |
| 4,933,883 A | 6/1990 | Pennebaker et al. | |
| 4,965,763 A | 10/1990 | Zamora | |
| 4,991,094 A | 2/1991 | Fagan et al. | |
| 5,099,440 A | 3/1992 | Pennebaker et al. | |
| 5,586,266 A | * 12/1996 | Hershey et al. | ............. 702/182 |
| 5,610,812 A | 3/1997 | Schabes et al. | |
| 5,689,585 A | 11/1997 | Bloomberg et al. | |
| 5,737,621 A | * 4/1998 | Kaplan et al. | ............... 707/531 |
| 5,806,021 A | * 9/1998 | Chen et al. | ..................... 704/9 |
| 5,832,530 A | 11/1998 | Paknad et al. | |
| 5,832,531 A | 11/1998 | Ayers | |
| 5,835,892 A | 11/1998 | Kanno | |
| 5,862,251 A | 1/1999 | Al-Karmi et al. | |
| 5,892,842 A | 4/1999 | Bloomberg | |
| 5,931,965 A | * 8/1999 | Alamouti | ..................... 714/792 |
| 5,933,633 A | * 8/1999 | Good et al. | .................. 717/131 |
| 6,055,365 A | * 4/2000 | Tye | ................................ 716/1 |
| 6,269,189 B1 | * 7/2001 | Chanod | ...................... 382/229 |

FOREIGN PATENT DOCUMENTS

| | | |
|---|---|---|
| EP | 0266001 | 5/1995 |
| EP | 0701223 | 5/1997 |
| EP | 0702322 | 6/1997 |
| EP | 0779594 | 1/1998 |
| WO | 9800794 | 1/1998 |
| WO | 9808169 | 2/1998 |

OTHER PUBLICATIONS

U.S. application Ser. No. 09/388,007, filed Sep. 1, 1999, entitled "Method, System, and Program for Determining Boundaries in a String Using a Dictionary".

U.S. application Ser. No. 09/388,329, filed Sep. 1, 1999, entitled "Method, System, and Program for Generating a Determinstic Table to Determine Boundaries Between Characters".

* cited by examiner

*Primary Examiner*—Heather R. Herndon
*Assistant Examiner*—Charles A. Bieneman
(74) *Attorney, Agent, or Firm*—David W. Victor; Konrad, Raynes, Victor & Mann (57) ABSTRACT

Disclosed is a system, method, and program for generating a table for use by a computer in determining a location of a boundary, such as a word boundary, between two characters in text. A first table indicates a boundary between characters when processing text in a first direction, such as the forward direction. A second table is generated based on the content of the first table. The second table can be used to determine whether one boundary is located between any two consecutive characters processed in a second direct ion, such as the backward direction.

8 Claims, 6 Drawing Sheets

FIG. 1
PRIOR ART

|   | ltr | digit | , | . | $ | % |
|---|---|---|---|---|---|---|
| 1 | 2 | 4 |   |   | 7 |   |
| 2 | 2 | 4 | 3 |   |   |   |
| 3 | 2 |   |   |   |   |   |
| 4 | 2 | 4 |   | 5 |   | 6 |
| 5 |   | 4 |   |   |   |   |
| 6 |   |   |   |   |   |   |
| 7 |   | 4 |   |   |   |   |

FIG. 2
PRIOR ART

|   | ltr | digit | , | . | $ | % |
|---|---|---|---|---|---|---|
| ltr |   |   |   | X | X | X |
| digit |   |   | X |   |   | X |
| , |   | X | X | X | X | X |
| . | X |   | X | X | X | X |
| $ | X | X | X | X | X | X |
| % | X |   | X | X | X | X |

|   | ltr | digit | , | . | $ | % |
|---|---|---|---|---|---|---|
| 1 | 2 | 3 | 4 | 5 | 6 | 7 |
| 2 | 2 | 3 | 4 |   |   |   |
| 3 | 2 | 3 |   | 5 | 6 |   |
| 4 | 2 |   |   |   |   |   |
| 5 |   | 3 |   |   |   |   |
| 6 |   |   |   |   |   |   |
| 7 |   | 3 |   |   |   |   |

FIG. 7

METHOD, SYSTEM, AND PROGRAM FOR GENERATING A TABLE TO DETERMINE BOUNDARIES BETWEEN CHARACTERS

BACKGROUND OF THE INVENTION

1. Field of the Invention

Preferred embodiments provide a method, system, and program for generating a table to use to determine boundaries between characters and, in particular, generating the table from a state machine table.

2. Description of the Related Art

Computer text editors display words on a page such that characters within each word remain together. Words are typically separated by a whitespace or a punctuation, such as a period, comma, semi-colon, etc. During operation, a word processor (text editor) may have to determine morphological boundaries in text, such as characters, words, sentences or paragraphs. For instance, during the operation of a spell check program, the word processor must go from the beginning to the end of the document to locate each word on which to perform a spell check operation. One program used to locate word, sentence or character boundaries in text is the International Business Machines Corporation ("IBM") BreakIterator. The BreakIterator program is a class in the Java Class Libraries, which is part of both the Java Developer Kit (JDK), which comprises programming tools for developers to create Java programs, and the Java Runtime Environment (JRE), which is the application to execute Java programs. BreakIterator uses a state machine table to process each character to determine whether a morphological boundary has been reached.

A state machine provides an output based on one or more received inputs. A state machine in effect memorizes previous inputs to determine the current output. A non-deterministic state machine can indicate a multiple number of output states for a given input, whereas a deterministic state machine indicates only one output state given the input. The behavior of a deterministic machine can be defined in a state transition diagram, such as that shown in FIG. 1, which illustrates an abstraction of the type of state machine BreakIterator uses to determine morphological boundaries based on a previous character and a next transition character.

Figure 1:
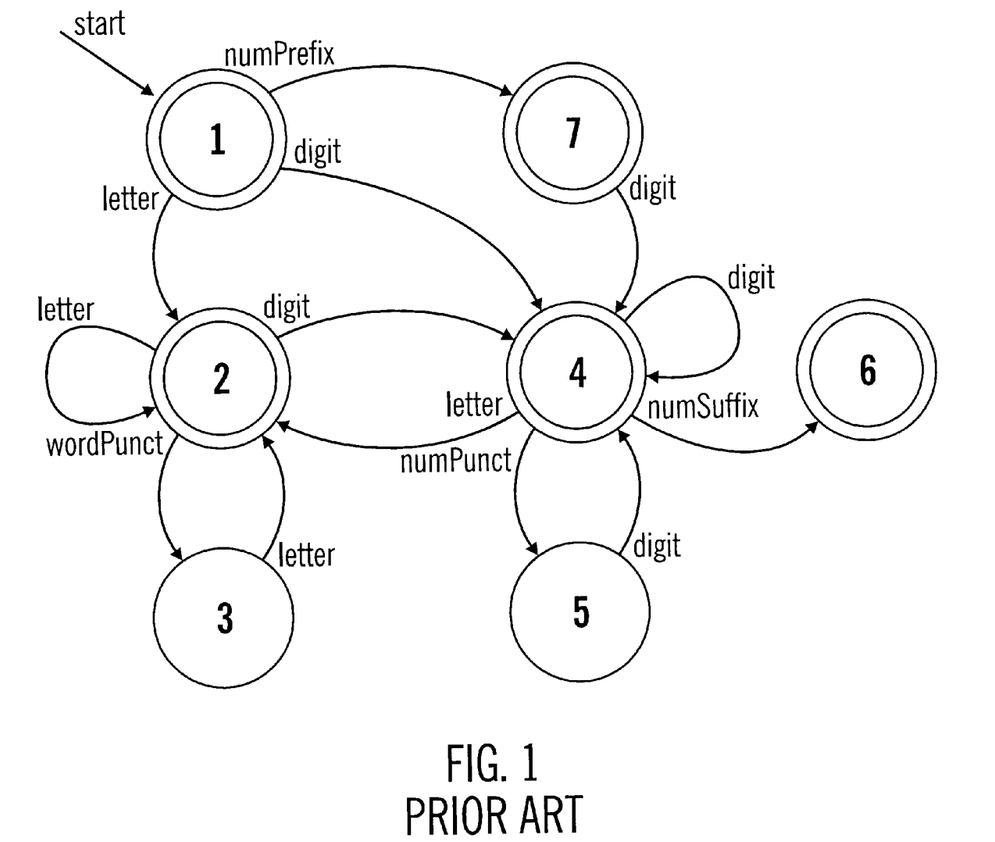
FIG. 1 illustrates a state machine to determine word boundaries in a document in a manner known in the art.

FIG. 1 illustrates a state transition diagram, which shows all possible states as circles. The circles are connected by arrows representing possible state transitions. The arrows are labeled by the input values that cause the particular transition, e.g., the arrow from state 2 to state 4 indicates that the input is a digit. A double circle represents an accepting state. If the current state is an accepting state, and the next character in the text does not indicate a transition along any of the transition lines, then a word boundary is placed after the accepting state position. A single circle indicates a non-accepting state. If the current state is one of the non-accepting states, and the character in the next position does not provide a transition to an accepting state, then the end of word boundary is placed at the position following the previous accepting state from which the transition to the current non-accepting state occurred. For instance, if the current state is a letter (2), then receiving another letter will cause a transition (letter) back to the letter state (2), receiving a digit will cause a transition (digit) to the digit (4) state, or receiving a word punctuation will cause a transition (wordPunct) to the word punctuation state (3). Word punctuation refers to punctuation marks that are acceptable for use within words, such as hyphens and apostrophes. Digit punctuation refers to punctuation marks acceptable within numbers, such as a decimal point, comma, etc. If the current state is a digit (4) and number suffix is the input character, then the transition (numSuffix) will lead to the number suffix state (6). Because there is no transition possible out of the number suffix state (6), a word boundary is placed thereafter. Alternatively, at the punctuation state (3 and 5) from the letter state (2) or the number state (4), there is no transition if the next character is further punctuation. This means that at the punctuation non-accepting states (3 and 5), if the next character is punctuation, then a word boundary will be placed at the previous accepting state, which is the previous letter (2) or number (4) state, respectively, from which the non-accepting punctuation state (3 or 5) was reached. After placing a word boundary, control proceeds to the start state (1) to process the next characters in the text to determine a next word boundary.

Figure 2:
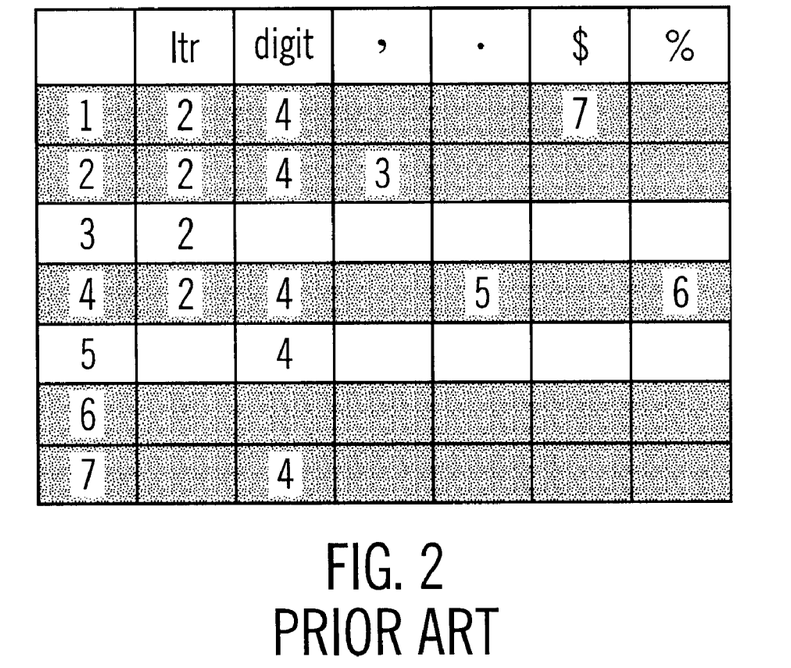
FIG. 2 illustrates a table representing the state machine shown in FIG. 1 in a manner known in the art.

FIG. 2 illustrates a table representing the state machine in FIG. 1 that the text editor program uses to determine word boundaries. The shaded rows indicate accepting states. A row indicates a current state and the column indicates an input character. The value in the cell indicates the next row (or state) to transition to if the next input character is the character for this cell's column. For instance, values in row 1 are at the start state. The cell value in row 1, column 1 indicates reading a letter character following the start position, which causes a transition to row 2, which represents the transition to the letter state 2. At a letter state, which is indicated as row 2 in the table, receiving an apostrophe or other punctuation causes the transition that leads to the punctuation state, which is represented by row 3 in the table in FIG. 2. If a letter is received as input in the punctuation state, then transition 2 proceeds back to the letter state, which is the value in the first column (the letter column) in row 3. Anything other than a letter at the punctuation state, shown as the other columns in row 3 following the letter ("ltr") column, indicates no transition, which causes the insertion of a word boundary. Thus, at a state i, the next position is determined by the value in row i at the column corresponding to the character type at the next position in the input text. If the cell correpsonding to row i and the column for the character type in the next position is a number, then the next state is provided at the row corresponding to the number. If the cell with row i and the column corresponding to the next character is empty, then the word boundary has been reached.

The state machine shown in FIGS. 1 and 2 is used to proceed forward to locate word boundaries. However, the program may need to determine the nearest word boundaries before and after an arbitrary location, such as the location of word boundaries before and after a randomly accessed location in the text, such as a cursor location in the middle of a word. In such case, the program needs to move backwards in the sentence to locate a position that is unambiguously a boundary position. For instance, the program could proceed to the beginning of the document, and then use the state machine shown in FIGS. 1 and 2 to proceed forward to an end of word boundary following the randomly accessed position, i.e., current cursor position. In this way, the program would know that the word boundary following the randomly accessed position is the end of the word including the random position and a determined word boundary immediately preceding the random position is the boundary for the beginning of the word. The program could then highlight the characters between the determined beginning and end of word boundaries.

Word processing programs typically do not back up to the beginning of the document to start determining word boundaries because the cursor or other randomly accessed position could be located far below the top of the document, thereby requiring numerous unnecessary word boundary detections well before the cursor position. The prior art BreakIterator class backs-up to a position that is an unambiguous word break. This process is referred to as random access iteration to determine a word boundary prior to any randomly accessed point in a document. From this backed-up position, the program then uses the logic of FIGS. 1 and 2 to move forward to determine the word boundary following the cursor or randomly accessed position.

In the prior art IBM BreakIterator class, a backward state table is created to determine unambiguous word boundaries between characters. The state table used with BreakIterator is filled in directly by the programmers on an ad hoc basis. The process of generating the backwards state table by having programmers directly encode the table is substantially labor intensive and time consuming.

Thus, there is a need in the art to provide an improved method, system, and program for determining where in a document to back-up to be at a position that is unambiguously before the word break prior to a randomly accessed position within a document.

SUMMARY OF THE PREFERRED EMBODIMENTS

To overcome the limitations in the prior art described above, preferred embodiments disclose a method, system, and program for generating a table for use by a computer in determining a location of a boundary between two characters. A first table indicates a boundary between characters when processing text in a first direction. A second table is generated based on the content of the first table. The second table can be used to determine whether one boundary is located between any two consecutive characters processed in a second direction.

In further embodiments, the first table comprises rows and columns defining a state machine table indicating a next state based on a current state and an input character. Further, the second table indicates whether one boundary should be placed between any two consecutive characters processed in the second direction.

In still further embodiments, the second table is a paired comparison table implemented as a state machine.

Preferred embodiments provide an algorithm for automatically generating a table for determining unambiguous boundaries when moving in one direction in text from a state machine table for determining all boundaries in the opposite direction. With the preferred embodiments, programmers do not have to manually modify the table indicating whether boundaries should be inserted for use in processing characters in the text in a backward direction because such table, and other related tables, are generated from the state machine table for processing characters in the forward direction.

BRIEF DESCRIPTION OF THE DRAWINGS

Referring now to the drawings in which like reference numbers represent corresponding parts throughout.

DETAILED DESCRIPTION OF THE PREFERRED EMBODIMENTS

In the following description, reference is made to the accompanying drawings which form a part hereof, and which illustrate several embodiments of the present invention. It is understood that other embodiments may be utilized and structural and operational changes may be made without departing from the scope of the present invention.

Computing Environment

Figure 4:
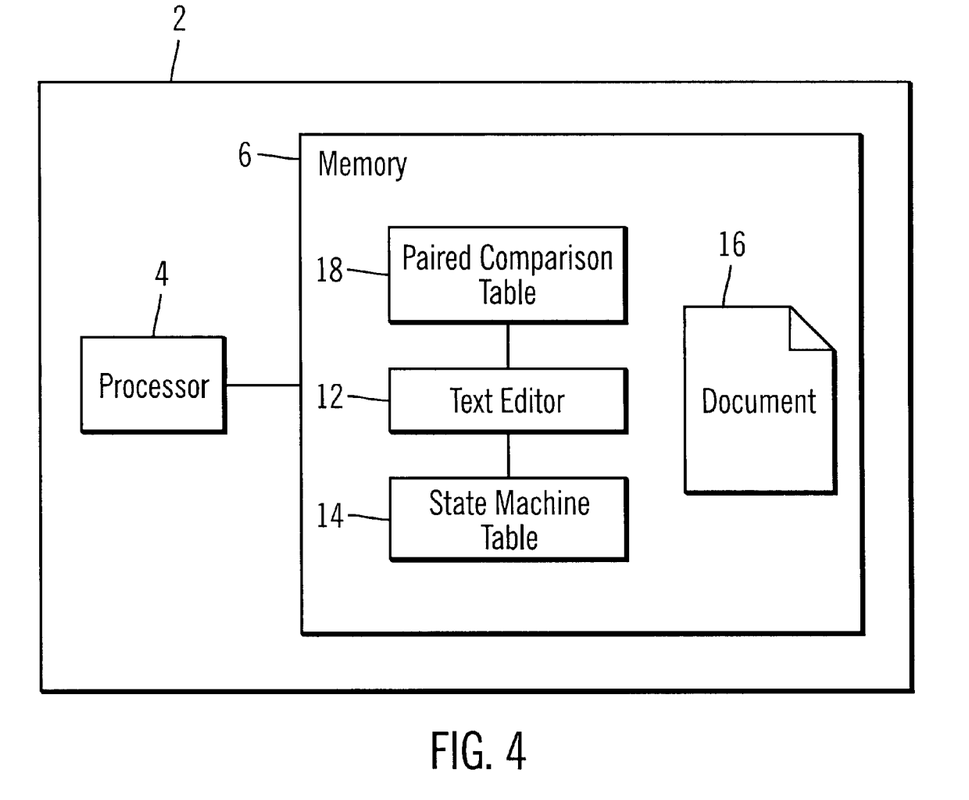
FIG. 4 illustrates a computing environment in which preferred embodiments are implemented.

FIG. 4 illustrates a computing environment in which preferred embodiments are implemented. The computing environment includes a computer system 2 having a processor 4 and a memory 6. The processor 4 may comprise any computer microprocessor device known in the art. The memory 6 may comprise any computer volatile memory device known in the art for storing data structures that the processor 4 is accessing and processing. Alternatively, the memory 6 may comprise any type of nonvolatile storage device known in the art capable of being accessed by the processor 4, such as a hard disk drive, tape drive, etc.

The memory 6 includes a text editor program 12, a table 14 representing a state machine to determine word boundaries, a document 16, and a paired comparison table 18 for determining word boundaries between two characters when moving backwards through text in the document 16.

Figure 3:
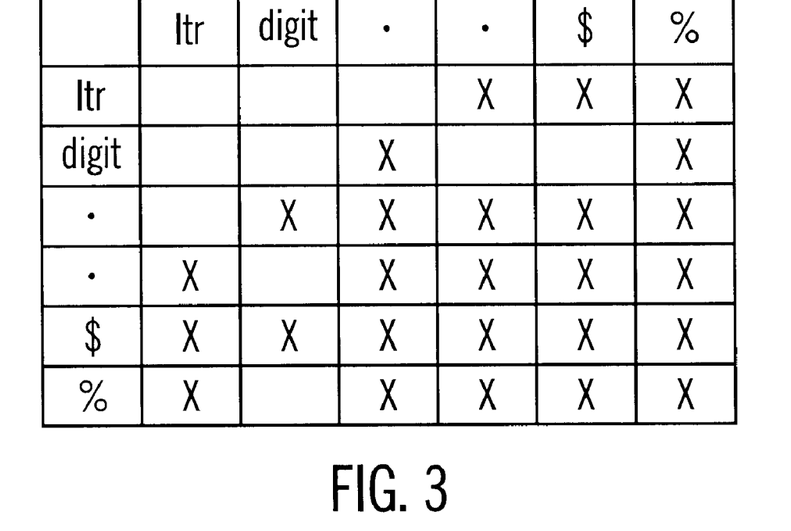
FIG. 3 illustrates a paired comparison table used to determine a word boundary when proceeding backwards in a document in accordance with preferred embodiments of the present invention.

FIG. 3 provides an example of a paired comparison table 18 to determine whether an unambiguous break has been reached during backward movement from a randomly accessed position within a word. Any two consecutive character possibilities are provided in the paired comparison table; the character at the current position is a row value, and the character at the previous position is a column value. An X, which is binary one or "on," in a cell indicates that a word break always occurs between an occurrence of the character indicated in the column followed, when moving in the backward direction, by the character indicated at the row. Thus, when reading characters in the backwards direction, for any two consecutive characters i and j, if column i and the row j is non-empty, then there is a break between i and j. For instance, if the first character in any two consecutive characters is a letter, indicated in the letter column, and the second character is a period, indicated in the period row, then the corresponding row/column value in the paired comparison table would be non-empty to indicate that a word break occurs between letter and period (".") characters. In this way, the paired comparison table of FIG. 3 can be used to determine an unambiguous word break when moving backward in the text.

The state machine table 14 may be in the structure of the state machine table illustrated in FIG. 2 and the paired comparison table 18 may be in the structure of the paired comparison table illustrated in FIG. 3. The text editor program 12 executes in memory 6 to process characters in document 16, which may include letters in any language. If the text editor program 12 needs to determine word boundaries while moving forward through the characters in the document 16, the text editor would repeatedly determine a next state in the state machine table 14 based on the character at the current position and the input character at the next position to determine whether a word boundary exists between two characters.

Preferred embodiments provide an algorithm for generating the paired comparison table 18 that is used during a random access of a location in the text to move backward from the current randomly accessed position to an unambiguous word boundary. This second table may be a paired comparison table, such as shown in FIG. 3 or a state table that is used to determine unambiguous word boundaries between characters when moving backwards through text. Moving forward through the text comprises moving to the right in languages that read from left-to-right, such as English, Spanish, etc., and to the left in languages that read from right-to-left, such as Arabic and Hebrew. However, the use of English characters within Arabic or Hebrew text would change the direction of some characters. Thus, the direction depends on the character encoding used. Moving backward in the text comprises moving to the left in languages that read from left-to-right and moving to the right in languages that read from right-to-left.

Preferred embodiments provide an algorithm for generating a table to determine unambiguous word breaks between any two character types when moving backward in text, such as the paired comparison table shown in FIG. 3. FIG. 4 illustrates the text editor 12 receiving as input a state machine table 14, such as the table shown in FIG. 2, and then generating as output a paired comparison table 18 which is used when moving backward in the document for determining whether a word boundary should be inserted between any two consecutive character types from a randomly accessed position in the document 16.

Figure 5:
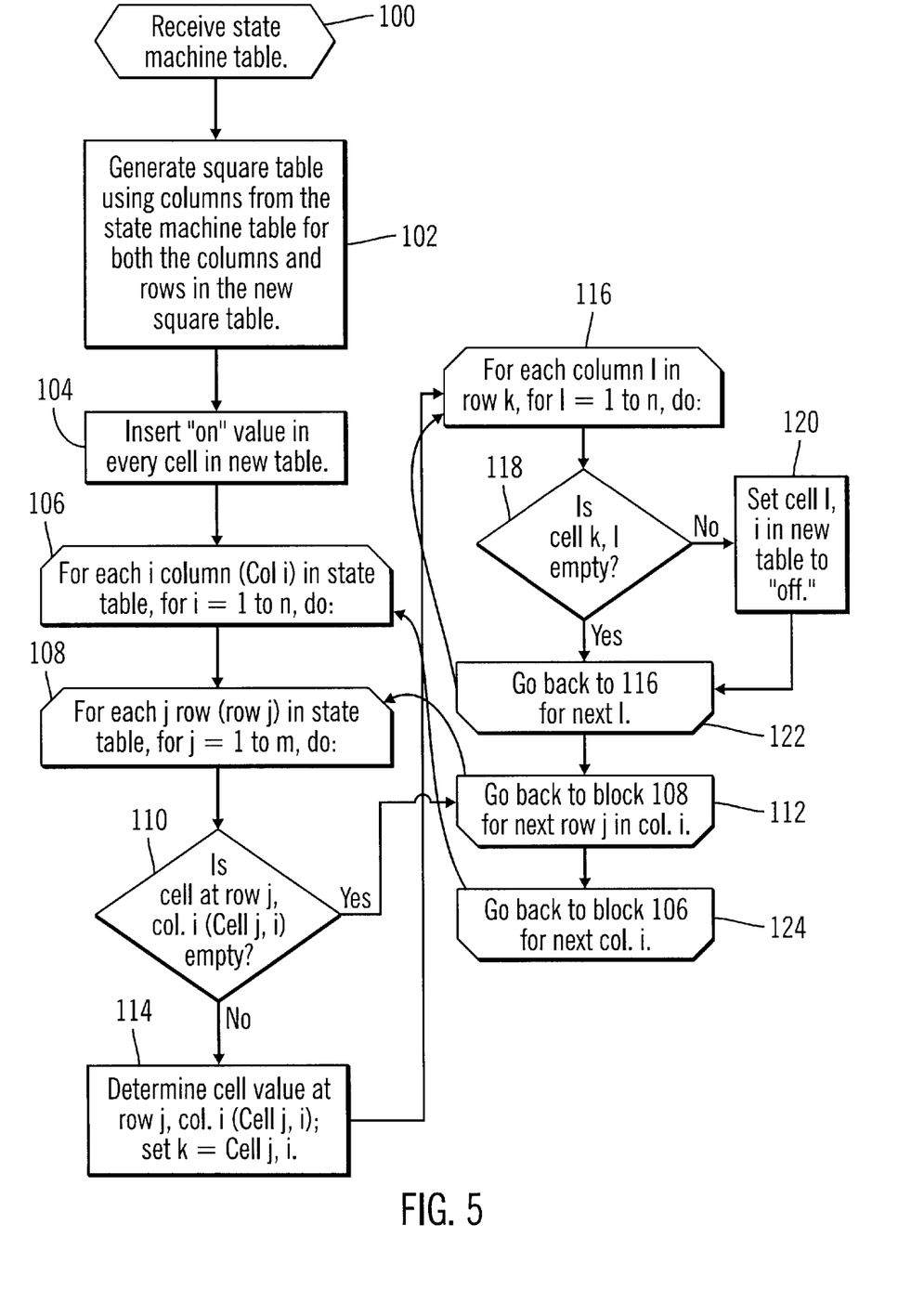
FIG. 5 illustrates logic to generate a paired comparison table from a forward state machine table in accordance with preferred embodiments of the present invention.

Preferably, the text editor program 12 generates the paired comparison table 18 during initialization. From a word break determined with the paired comparison table 18 when moving backward, the text editor program 12 can then turn around and move forward through the document to locate the word boundary immediately following the randomly accessed location. This determined word boundary and the immediately preceding word boundary would define a word including the randomly accessed location. FIG. 5 illustrates logic to generate a paired comparison table 18 from a state machine table, such as shown in FIG. 2.

With respect to FIG. 5, control begins at block 100 with the text editor program 12 receiving a state machine table 14 for determining word boundaries when moving forward in the text, such as the state machine table shown in FIG. 2. The text editor 12 generates (at block 102) a square table using the number of columns from the state machine table to provide the number of columns and rows in the new table. Each cell in the new table is set (at block 104) to "on," i.e., digital one. The text editor 12 then begins a loop (at block 106) to process each column i in the received state machine table 14 for i=1 to n, where n is the total number of columns in the input state machine table 14. The text editor 12 begins an inner loop (at block 108), with respect to the loop at block 106, to process each row j of the state machine table 14, where j=1 to m, such that m is the number of rows in the state machine table 14. Within the inner loop, the text editor 12 determines (at block 110) whether the cell at row j, column i ($Cell_{i,j}$) is empty. If so, the text editor proceeds (at block 112) back to block 108 to consider the next (j+1)th row in column i. Otherwise, if $Cell_{i,j}$ is non-empty, then the text editor 12 sets (at block 114) the variable k to the content of $Cell_{i,j}$.

The text editor 12 then begins another inner loop at block 116, that is inner with respect to the loop at block 108, for each column l in row k, for l=1 to n, where n is the number of columns in the state machine table 14. Within this second inner loop, the text editor 12 determines (at block 118) whether the cell at row k, column l ($Cell_{k,l}$) is empty. If not, the text editor 12 sets the cell at row l, column i ($Cell_{l,i}$) in the new table to "off" to indicate that a word boundary is not always located between the characters of row l and column i. Otherwise, if the $Cell_{k,l}$ is empty (from the yes branch of block 118) or after setting $Cell_{l,i}$ to "off," the text editor 12 proceeds back to block 116 to consider the next (l+1)th column. The cell contains "on" or "true" only when there is always a break between those characters, regardless of the situation. After considering whether each lth column in row k is empty or not, and taking appropriate action based thereon, the text editor 12 proceeds (at block 112) back to block 108 to consider the next (j+1)th row in column i. After considering all m rows, the text editor proceeds (at block 124) back to block 106 to consider the next (i+1)th column. After going through all the entries in the state machine table 14 according to the logic of FIG. 5, the text editor 12 saves the newly generated square table, including any modified values, as the paired comparison table 18. In this way, the text editor 12 uses values in the state machine table 14 to automatically generate the contents of the paired comparison table 18, which may be used to determine an unambiguous word boundary between any two characters when moving backwards in the document 16.

Figure 6:
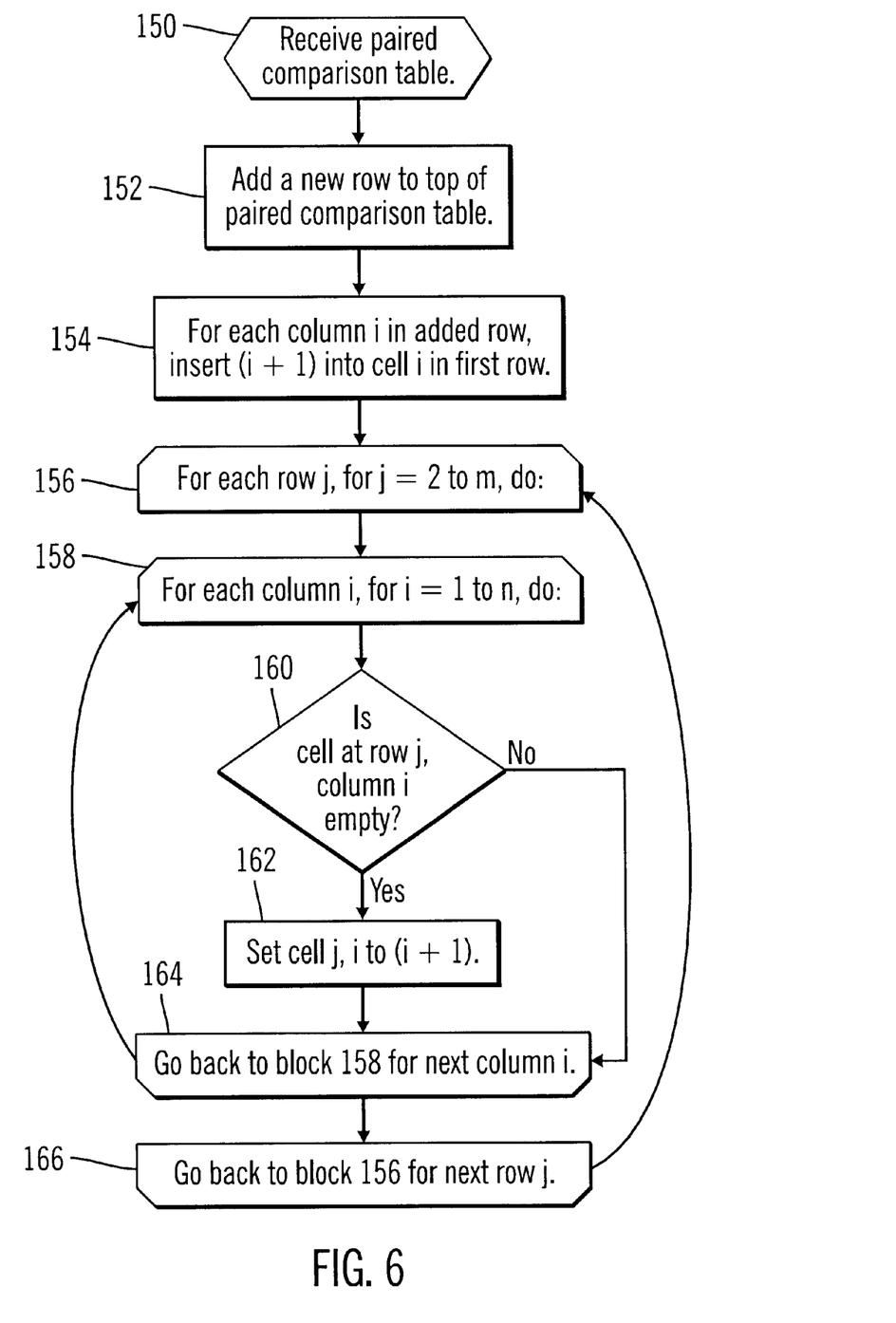
FIG. 6 illustrates logic to generate a backward state machine table from a paired comparison table for determining word breaks when moving in a backwards direction through text in accordance with preferred embodiments of the present invention.

FIG. 6 illustrates logic to generate a backward state machine table from the paired comparison table 18 to determine word boundaries when moving backwards in the text. This backward state machine table may be used by the text editor 12 instead of a paired comparison table when moving backwards to locate a word boundary. After locating a word boundary during backward movement, the text editor 12 will reverse itself and move forward to locate a word boundary following the randomly accessed location. Control begins at block 150 with the text editor 12 receiving a paired comparison table 18 such as the paired comparison table shown in FIG. 3. The text editor 12 then adds (at block 152) a new row to the top of the paired comparison table. Each ith column in the first, added, row is then set (at block 154) to i plus one. The text editor 12 then proceeds to block 156 to begin a loop for each row j in the table for j=2 to m and an inner loop at block 158 for every column i in row j, for i=1 to n. After adding the new row, all the other rows are renumbered, hence the use of (i+1) to populate the contents of the added row. Within both loops, the text editor 12 then determines whether the cell at row j, column i ($Cell_{j,i}$) is empty. If so, the cell at row j, column i ($Cell_{j,i}$) is set to (i+1). Otherwise, if the cell ($Cell_{j,i}$) is not empty or from block 162, then control proceeds (at block 164) back to block 158 to consider the next (i+1)th column. After considering the nth column for row j, control proceeds (at block 166) back to block 156 to consider the next (j+1)th row. FIG. 7 illustrates a backwards state table to determine word breaks generated from the paired comparison table using the logic of FIG. 6.

Figure 7:
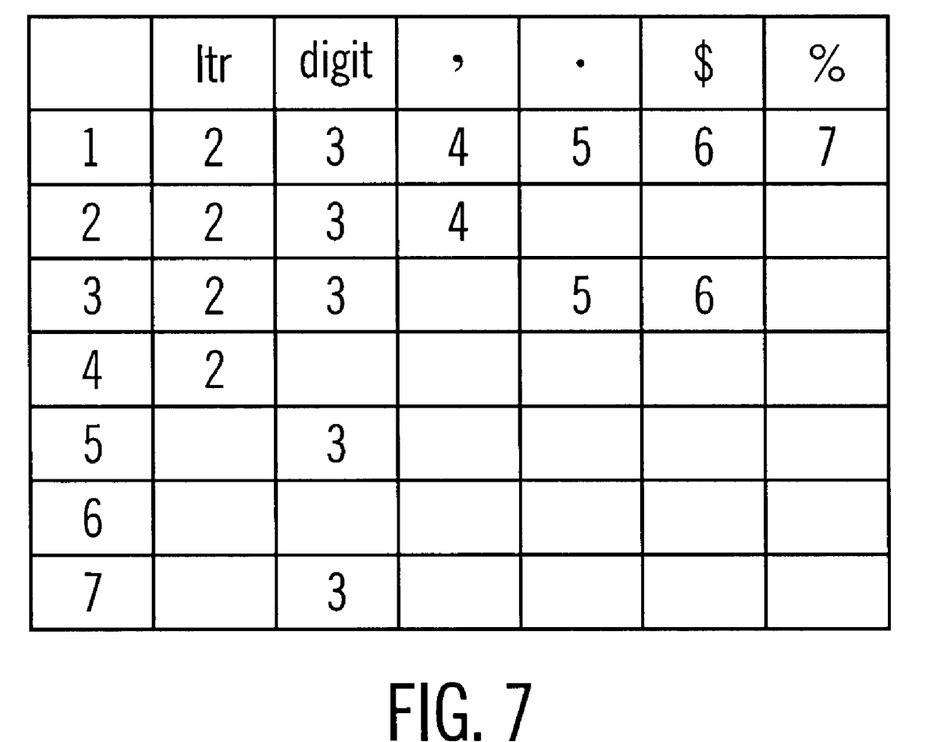
FIG. 7 illustrates a backwards state machine table generated with the logic illustrated in FIG. 6 in accordance with preferred embodiments of the present invention.

Thus, the backward state machine table FIG. 7 may be used when going backward from a randomly accessed point to determine the first word break. For instance, if the current state is a letter and the next character, moving backward, is a period ".", then the absence of a value in the cell for this state, moving from a letter to a period ".", indicates that a word break should be added before the letter, as the text is being processed in a backwards direction. If the current state is a digit, and the next character is a period ".", then the cell at row 3, column 4 indicates that row 5 is for the digit state. From this digit in row 5, if a period "." follows, then a word boundary is positioned after the last digit. Thus, when moving backwards from a current character j to a new character i, the text editor 12 must look in the table at row j, column i, to determine the next state or row to use to consider with respect to the next further character.

Preferred embodiments thus provide an algorithm to generate a paired comparison table and a backward state machine table from a forward looking state machine table 14 to determine unambiguous word boundaries when moving backward in the text from any randomly accessed location.

Alternative Embodiments and Conclusions

This concludes the description of the preferred embodiments of the invention. The following describes some alternative embodiments for accomplishing the present invention.

The preferred embodiments may be implemented as a method, apparatus or article of manufacture using standard programming and/or engineering techniques to produce software, firmware, hardware, or any combination thereof. The term "article of manufacture" (or alternatively, "computer program product") as used herein is intended to encompass one or more computer programs and data files accessible from one or more computer-readable devices, carriers, or media, such as a magnetic storage media, "floppy disk," CD-ROM, a file server providing access to the programs via a network transmission line, holographic unit, etc. Of course, those skilled in the art will recognize that many modifications may be made to this configuration without departing from the scope of the present invention.

The preferred embodiment algorithms of FIGS. 5 and 6 may be implemented in an object oriented program language such as Java, or, in further embodiments, any other programming language known in the art.

The preferred algorithm described particular steps as occurring in a particular order. However, in further embodiments the order of the steps may be changed and certain steps removed and added without departing from the scope of the invention. Moreover, different steps may be performed to execute the overall operation of the algorithm.

Preferred embodiments described state machine and paired comparison tables having a particular row/column format. However, those skilled in the art will appreciate that the backward state machine and paired comparison tables may be implemented in alternative data structures than those described herein. Still further, the arrangement of rows to columns may be switched, to columns to rows.

Preferred embodiments were concerned with generating a backward paired comparison table or backward state machine table from a forward looking state machine table to determine an unambiguous word boundary when moving backwards in text. However, in further embodiments the backward paired comparison table or backward state machine table generated therefrom may include rules to determine an unambiguous sentence or paragraph boundary for situations where the text editor 12 wants to determine the sentence or paragraph including the randomly accessed location in the text. For instance, if a user triple clicks at a position in the text, then the cursor would highlight the sentence including the location at which the cursor clicked; likewise a quadruple click would highlight the entire paragraph including the cursor position when the quadruple click was made. In such case, the preferred embodiments could generate a backward paired comparison and backward state machine table from a forward state machine table that could be used to determine a sentence or paragraph boundary when moving backwards from a randomly accessed location. After reaching a sentence or paragraph word boundary when moving backwards, the text editor 12 could then reverse itself and move forward, using the state machine used to generate the backward paired comparison table, to determine the sentence or paragraph boundary following the randomly accessed location. This following sentence or paragraph boundary and the immediately preceding boundary would define the boundaries of the sentence or paragraph including the randomly accessed location.

Preferred embodiments were described with generating a paired comparison and state machine table for determining word boundaries when moving in the backward direction through text. However, in further embodiments, the algorithm may generate from a backward state machine table a paired comparison and state machine table for determining word boundaries when processing text in the forward direction.

In summary, the present invention provides a system, method, and program for generating a table for use by a computer in determining a location of a boundary between two characters. A first table indicates a boundary between characters when processing text in a first direction. A second table is generated based on the content of the first table. The second table can be used to determine whether one boundary is located between any two consecutive characters processed in a second direction.

The foregoing description of the preferred embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method for generating a table for use by a computer in determining a location of a boundary between two characters, comprising:

receiving a first table indicating a boundary between characters when processing text in a first direction, wherein the first table comprises rows and columns defining a state machine table indicating a next state based on a current state and an input character, and wherein, for the first table, the rows indicate a current state, the columns indicate an input character, a non-empty row/column value indicates the a row including the a next state, and an empty row/column value indicates a boundary following the a current state;

automatically generating a second table based on the a content of the first table, wherein the second table indicates whether one boundary should be placed between any two consecutive characters processed in the a second direction, and wherein generating the second table comprises:

generating the second table using the columns from the first table as the columns and rows of the second table; and indicating an absence of the a boundary at a column/row value in the second table if the a corresponding column/row value in the first table indicates the a next state; and using the second table to determine whether one boundary is located between any two consecutive characters processed in a the second direction.

2. A method for generating a table for use by a computer in determining a location of a boundary between two characters, comprising:

receiving a first table indicating a boundary between characters when processing text in a first direction, wherein the first table comprises rows and columns defining a state machine table indicating a next state based on a current state and an input character, and wherein a row/cell value in the first table indicates the a row including the a next state based on the a current state indicated in the row and the input character indicated in the column;

automatically generating a second table based on the a content of the first table, wherein the second table indicates whether one boundary should be placed between any two consecutive characters processed in the a second direction, and wherein generating the second table comprises:

determining, for each column i and row j pair in the first table, whether a column i, row j value cell in the first table is empty;

setting a variable k to a value of the column i, row j value cell in the first table if the cell is not empty;

determining, for each column l, whether a row k, column l cell in the first table is empty; and setting the a value of a column l, row i value cell in the second table to indicate no boundary between a first character of the a type indicated in column l of the second table and a second character of the a type indicated in row i of the second table; and using the second table to determine whether one boundary is located between any two consecutive characters processed in a the second direction.

3. A method for generating a table for use by a computer in determining a location of a boundary between two characters, comprising:

receiving a first table indicating a boundary between characters when processing text in a first direction, wherein the first table comprises rows and columns defining a state machine table indicating a next state based on a current state and an input character;

automatically generating a second table based on the a content of the first table, wherein the second table indicates whether one boundary should be placed between any two consecutive characters processed in the a second direction, and wherein the second table is a paired comparison table implemented as a state machine; and using the second table to determine whether one boundary is located between any two consecutive characters processed in a the second direction.

4. A method for generating a table for use by a computer in determining a location of a boundary between two characters, comprising:

receiving a first table indicating a boundary between characters when processing text in a first direction, wherein the boundary is a member of a set of boundaries between characters consisting of: word boundaries, sentence boundaries, syllable boundaries, and paragraph boundaries;

automatically generating a second table based on the a content of the first table, wherein generating the second table comprises:

adding a new first row to the second table;

inserting, for each column i in the new first row of the second table, a value of i plus one;

performing, for each row j greater than two and column i in the second table:

(i) determining whether a row j, column i cell in the second table is empty; and (ii) setting a value of the row j, column i cell in the second table to i plus one if the row j, column i cell in the second table is empty; and using the second table to determine whether one boundary is located between any two consecutive characters processed in a second direction.

5. A system for generating a table for use in determining a location of a boundary between two characters, comprising:

a processor;

a memory accessible to the processor, including a document containing text and a first table;

means for processing the first table in the memory indicating a boundary between characters when processing the text in a first direction, wherein the first table comprises rows and columns defining a state machine table indicating a next state based on a current state and an input character, and wherein, for the first table, the rows indicate a current state, the columns indicate an input character, a non-empty row/column value indicates the a row including the a next state, and an empty row/column value indicates a boundary following the a current state;

means for automatically generating a second table in the memory based on the a content of the first table, wherein the second table indicates whether one boundary should be placed between any two consecutive characters processed in the a second direction, and wherein the means for generating the second table comprises:

means for generating the second table using the columns from the first table as the columns and rows of the second table; and means for indicating an absence of the a boundary at a column/row value in the second table if the a corresponding column/row value in the first table indicates the next state; and means for using the second table to determine whether one boundary is located between any two consecutive characters processed in a the second direction.

6. A system for generating a table for use in determining a location of a boundary between two characters, comprising:

a processor;

a memory accessible to the processor, including a document containing text and a first table;

means for processing the first table in the memory indicating a boundary between characters when processing the text in a first direction, wherein the first table comprises rows and columns defining a state machine table indicating a next state based on a current state and an input character, and wherein a row/cell value in the first table indicates the a row including the a next state based on the a current state indicated in the row and the input character indicated in the column;

means for automatically generating a second table in the memory based on the a content of the first table, wherein the second table indicates whether one boundary should be placed between any two consecutive characters processed in the a second direction, and wherein the means for generating the second table comprises:

means for determining, for each column i and row j pair in the first table, whether a column i, row j cell in the first table is empty;

means for setting a variable k to a value of the column i, row j value cell in the first table if the cell is not empty;

means for determining, for each column 1, whether a row k, column 1 cell in the first table is empty; and     means for setting the a value of a column l, row i value cell in the second table to indicate no boundary between a first character of the a type indicated in column l of the second table and a second character of the a type indicated in row i of the second table; and means for using the second table to determine whether one boundary is located between any two consecutive characters processed in a the second direction.

7. A system for generating a table for use in determining a location of a boundary between two characters, comprising:

a processor;

a memory accessible to the processor, including a document containing text and a first table;

means for processing the first table in the memory indicating a boundary between characters when processing the text in a first direction, wherein the first table comprises rows and columns defining a state machine table indicating a next state based on a current state and an input character;

means for automatically generating a second table in the memory based on the a content of the first table, wherein the second table indicates whether one boundary should be placed between any two consecutive characters processed in the a second direction, and wherein the second table is a paired comparison table implemented as a state machine; and means for using the second table to determine whether one boundary is located between any two consecutive characters processed in a the second direction.

8. A system for generating a table for use in determining a location of a boundary between two characters, comprising:

a processor;

a memory accessible to the processor, including a document containing text and a first table;

means for processing the first table in the memory indicating a boundary between characters when processing the text in a first direction, wherein the first table comprises rows and columns defining a state machine table indicating a next state based on a current state and an input character;

means for automatically generating a second table in the memory based on the a content of the first table, wherein the second table indicates whether one boundary should be placed between any two consecutive characters processed in the a second direction, and wherein means for generating the second table comprises:

means for adding a new first row to the second table;

means for inserting, for each cell at column i in the new first row of the second table, a value of i plus one; and     means for performing, for each row j greater than two and column i in the second table:

(i) determining whether a row j, column i cell in the second table is empty; and         (ii) setting a value of the row j, column i cell in the second table to i plus one if the row j, column i cell in the second table is empty; and means for using the second table to determine whether one boundary is located between any two consecutive characters processed in a the second direction.

* * * * *

UNITED STATES PATENT AND TRADEMARK OFFICE
CERTIFICATE OF CORRECTION

PATENT NO. : 6,626,960 B1
DATED : September 30, 2003
INVENTOR(S) : Richard Theodore Gillam It is certified that error appears in the above-identified patent and that said Letters Patent is hereby corrected as shown below:

Column 8,
Lines 63, 64, 65 and 66, delete "the".

Column 9,
Lines 3, 8, 27, 43, 47, 56 and 65, delete "the".
Lines 6, 31, 42 and 60, delete the first "the".
Lines 9, 10 and 23, delete the second "the".
Line 24, delete both "the".
Lines 34, 37 and 40, delete "value".

Column 10,
Lines 7, 38, 41, 44, 48, 50, 51 and 56, delete "the".
Line 37, delete both "the".

Column 11,
Lines 4, 11, 22 and 24, delete "the".
Lines 5, 8, 26 and 44, delete the first "the".
Lines 18 and 22, delete "value".
Line 30, delete "a".

Column 12,
Lines 3 and 25, delete "the".
Lines 8 and 41, delete "a".
Line 22, delete the first "the".

Signed and Sealed this

Ninth Day of May, 2006

JON W. DUDAS
*Director of the United States Patent and Trademark Office*